W. P. BARCLAY.
Atmospheric-Pumping System.

No. 221,903. Patented Nov. 25, 1879.

W. P. BARCLAY.
Atmospheric-Pumping System.

No. 221,903.　　　　Patented Nov. 25, 1879.

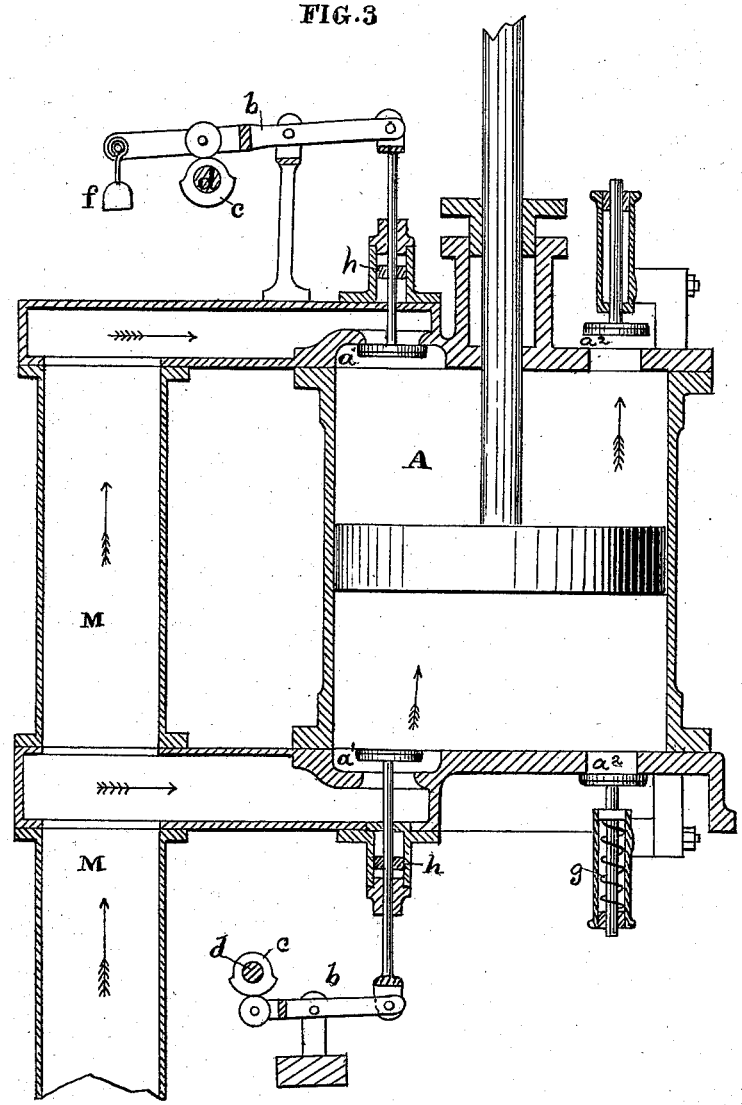

UNITED STATES PATENT OFFICE.

WILLIAM P. BARCLAY, OF SAN FRANCISCO, CALIFORNIA.

IMPROVEMENT IN ATMOSPHERIC PUMPING SYSTEMS.

Specification forming part of Letters Patent No. 221,903, dated November 25, 1879; application filed April 26, 1879.

*To all whom it may concern:*

Be it known that I, WILLIAM P. BARCLAY, of the city and county of San Francisco, and State of California, have invented an Atmospheric Pumping System; and I hereby declare the following to be a full, clear, and exact description thereof.

My invention relates to an improved atmospheric pumping system; and my improvements consist in providing at the surface of the mine an air-discharge cylinder or vacuum-engine, connected by an air-pipe with a series of atmospheric engines, situated at different levels in the mine, said engine being suitably connected with plunger force-pumps.

The air-discharge cylinder takes the atmospheric pressure or weight from opposite sides of the piston of the atmospheric engines alternately, so that these engines and their connected pumps will be operated at different levels by the one air-discharge cylinder, thus dispensing with all heavy pump-rods, as is more fully explained in the accompanying drawings, in which—

Figure 1 is a perspective view of my device. Fig. 2 is a plan view of the valves. Fig. 3 is a section of the cylinder A.

The air-discharge cylinder A is provided with inlet and outlet valves at each end, the inlet-valves $a'$ $a'$ being opened by suitable mechanism, and the outlet-valves $a^2$ $a^2$ opening automatically at the proper time when the piston of discharge-cylinder is put in motion.

The stems of the valves $a'$ $a'$ are connected with levers $b$, which are operated by the cams $c$ on the cam-shafts $d$, said cam-shafts being operated by suitable gearing connected with the driving or crank shaft, as shown.

The piston of the discharge-cylinder A is made to perform its stroke by being connected direct to the end of a steam-engine working-beam or otherwise. I have shown it as operated by cross-head B, connecting-rod C, and crank or fly wheel D, said wheels D having grooves formed in them for wire ropes. These ropes pass around similar but smaller grooved wheels on the crank-shaft of a steam-engine, thus allowing the piston-speed of the steam-cylinder to be run up to a high velocity.

Fig. 1 represents an atmospheric-air engine, in combination with a plunger or force pump, as commonly used for drawing or pumping the water from mines.

E is an atmospheric-air cylinder, having a piston with rod working through a stuffing-box on the upper cylinder-cover, this piston-rod being connected with the beam F, as represented.

To the end of the beam F nearest the cylinder E is attached the plunger G of a force-pump, H, said plunger passing through a stuffing-box at the upper end of the working-barrel. The opposite or small end of the beam F is secured to a pillow-block, which is firmly bolted to a proper foundation.

The cylinder E has a valve-chest, I, with ports leading to the top and bottom of the cylinder, and an exhaust-port leading into the pipe J, this pipe J being again led to the large air-discharge pipe M.

The pipe L conveys the atmospheric pressure from any part of the mine into the valve-chest I. The valve-chest I is furnished with an ordinary slide-valve, which allows the atmospheric pressure alternately to enter the top and bottom of the cylinder.

The valve in the chest is made to perform its proper movement by the interposition of a link with tappets connected to some suitable part of the beam immediately above. It may, however, be operated in any desired manner.

O is the column of pipe through which the plunger of the force-pump on the downstroke forces the water that has entered the working-barrel through the inlet-pipe N of the pump when the upstroke of the plunger was being made.

Fig. 3 shows the interior arrangement of valves and ports leading to the top and bottom of the air-discharge cylinder A. From this view the operation of the valves on the opposite sides of the piston will be seen.

Figure 1:
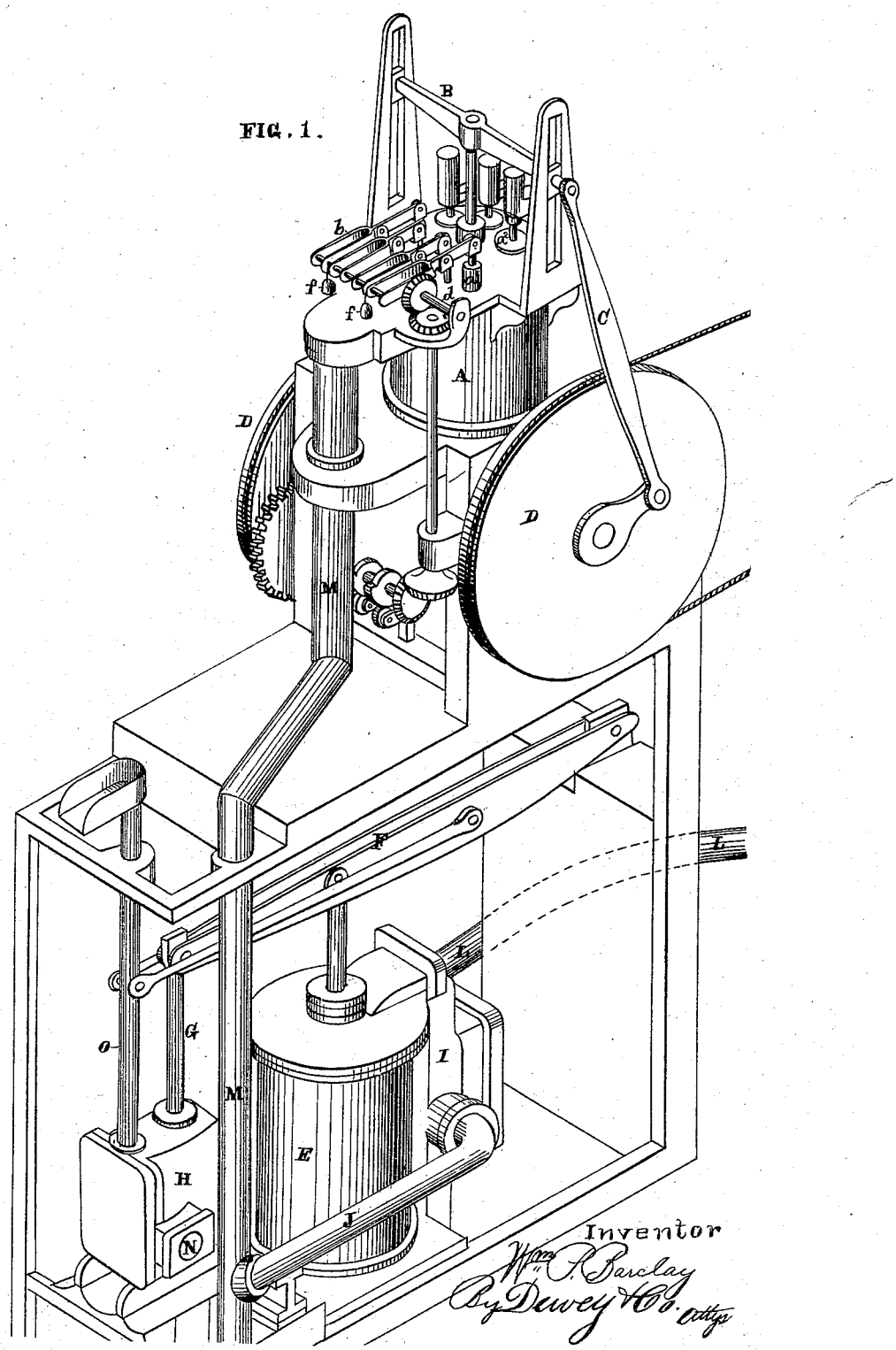
Figure 2:
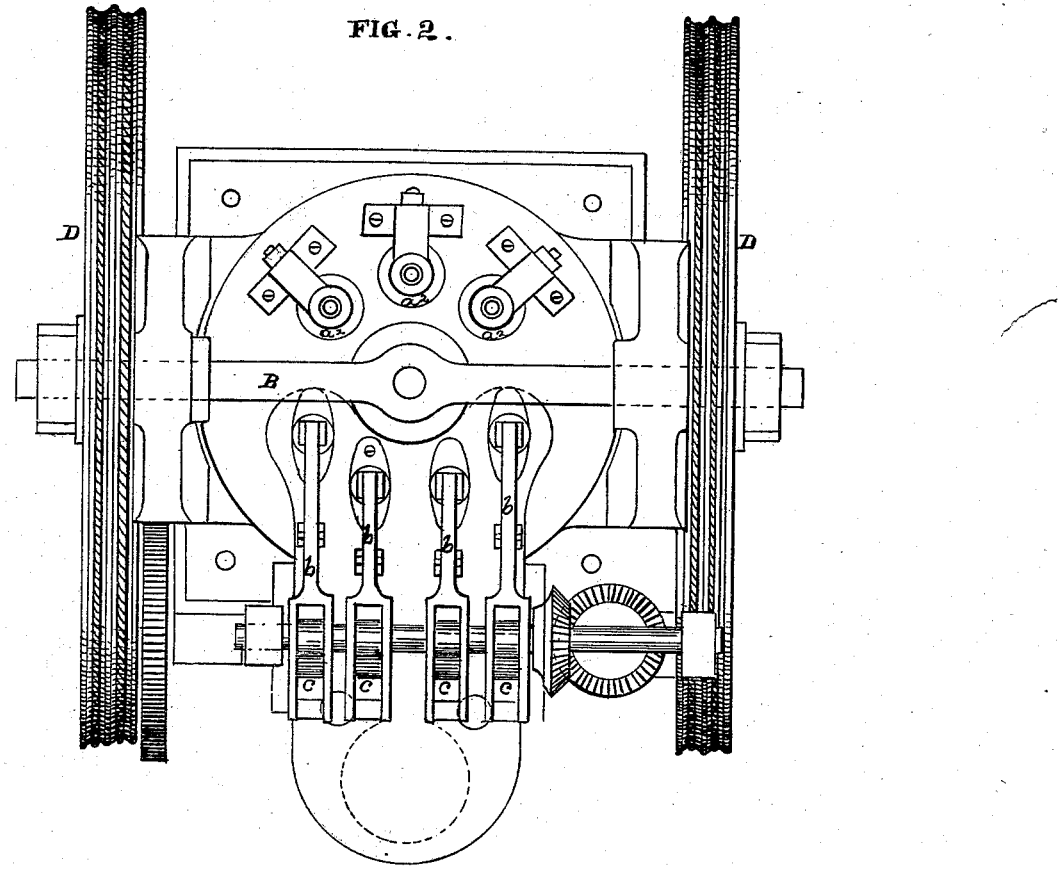
Fig. 2 represents a plan view of the arrangement of valves of the air-discharge cylinder A, the valves being similar at both ends, and each set being operated by the same mechanism of cams and levers. The upper set, however, have compensating weights $f$ at their outer ends, to assist in closing the valves quickly when the levers are relieved from the cams.

The piston is represented as traveling upward, and it will be seen that the air is entering the lower inlet-valve $a'$ while the lower outlet-valve $a^2$ is closed, and the air is escaping from the upper outlet-valve $a^2$ while the upper inlet-valve is closed. On the down-stroke of the piston the reverse motion takes place. The inlet-valves $a'$ $a'$ are only open to the air-pipe M, while the discharge-valves $a^2$ $a^2$ are open to the outside air.

Those discharge-valves at the upper end will drop to their seats by gravity alone on the return stroke of the piston, while those below have spiral springs $g$ fitted to their spindles to lift them quickly to their seats as the piston runs up. The inlet-valves are provided with cylindrical rubber rings $h$ in the stuffing-boxes for packing. These rings fit on the sides of the spindles, between it and the sides of the box, and assume an ovoid form, and they roll up or down by the motion of the valve, and prevent any leakage of air around the stem.

The operation of my device is as follows: The piston of the cylinder A, having a reciprocating motion given to it by the method described, or in any suitable manner, forces the air out through the discharge-valve openings $a^2$ at that end of the cylinder toward which the piston is traveling, these discharge-valves closing as soon as the piston commences its return stroke. There will now be a vacuum formed at that end of the cylinder from which the piston is receding, so that on the opening of the inlet-valve to that end of the cylinder from which the piston is traveling, the weight or pressure of the outside air being taken off the column that is in the pipe M, the air in that pipe will rush into the cylinder through the inlet-valves of the said cylinder.

As the air in the pipe M expands and its velocity of expansion becomes reduced down to the velocity with which it will follow up the average speed of piston in the discharge-cylinder A, the velocity of the said piston is equal to the balancing of the outside atmosphere minus the weight of the air in the pipe M, and the pressure of the outside atmospheric air is thus utilized in the working of a series of plungers or other pumps by the interposition of an atmospheric cylinder or cylinders working one or several force or lift pumps.

The pipe L, leading to the valve-chest I of the cylinder E, may be led to any part of the mine from which the foul air is required to be taken, and is utilized in working the atmospheric engine. As the air in this pipe L enters through the valve-chest of the atmospheric-air cylinder E when the piston is commencing its downstroke, for instance, the air-discharge cylinder A will draw the air from the pipe M, and, consequently, by means of the pipe J, from the cylinder E, under its piston, so that the weight of atmospheric air on top of said piston in cylinder E will be utilized in forcing it down and forcing, by means of the plunger attached to the beam, the water up its pipe. On the upstroke the reverse is the case, the air-discharge cylinder in each instance relieving the piston of the cylinder E of the atmospheric pressure on the opposite side from that in which the air is entering from the pipe I.

Any difference in the speed of the two cylinders will not affect the result, the piston of cylinder A being intended to travel faster than that of the cylinder E. In this way the air in the pipe M is kept constantly traveling upward, and even if a perfect vacuum were not formed in the cylinder E there would be pressure enough above the piston in said cylinder E to force out the small quantity of air that may remain in the cylinder just at the end of the stroke.

The speed of the piston in the air-discharge cylinder and the size of the pipe M are regulated properly, so that the air may be taken from one side of the pistons of combined atmospheric engines by the single air-discharge cylinder, and the rate of motion given to this column of air is such that a more or less complete vacuum will be produced sufficient to cause all these engines to run by the action of this single discharge-cylinder. These atmospheric engines, with their separate pumps in close connection with them, are placed at different levels in the mine, each being worked independently by the single air-discharge cylinder on top.

By this means, in a mine, for instance, two thousand feet in depth, instead of the pumps being worked by a massive engine on the surface, connected to the pumps by heavy pump-rods extending the whole depth, with the attendant balance-rod, bob, &c., the separate pumps are worked by the single air-discharge cylinder, as described.

The taking the weight of the outside atmosphere alternately from the upper and lower sides of the piston in the cylinder E, and admitting the weight or pressure at same time to the opposite side of piston from which the pressure is relieved, answers the purpose, through the instrumentality of the atmospheric engine, of working the pumps, instead of the usual cumbersome wooden pump-rods.

The piston of the air-discharge cylinder on the surface then has comparatively little duty at each stroke to perform, and, working in an elastic medium, may be run at a high speed, it only having to keep the column of air moving upward in the pipe connected with the atmospheric engines in order to cause said engines to operate the pumps.

Having thus described my invention, what I claim as new, and desire to secure by Letters Patent, is—

1. The air-discharge engine A, provided with suitable discharge-valves, and having its inlet-valves connected by means of the pipe M with a series of atmospheric engines, E, whereby the weight of the atmosphere is taken alternately from opposite sides of the pistons of said engines, so as to operate them and the connected pumps, substantially as and for the purpose herein described.

2. The air-discharge engine A, connected by an exhaust-pipe with one or more atmospheric engines, E, in combination with one or more pumps, with their discharge-pipes O, whereby I am enabled to lift water from mines and dispense with the use of pump-rods and balance-bobs, substantially as and for the purpose herein described.

3. The combination of a steam-engine and air-discharge cylinders, when the piston of the air-cylinder has a reciprocating motion produced by wire ropes passing partly around the balance-wheels and pulleys on the engine, whereby the rate of speed of the piston of said cylinder is made greater than that of the column of air, substantially as herein described.

4. In combination with an air-discharge cylinder connected by a pipe with atmospheric engines in a mine, the supply-pipe L, leading to said engines from such parts of the mine as contain foul air, whereby the bad air is drawn out and utilized in working said engines, substantially as and for the purpose herein described.

5. The pipe or column M, connected with a series of atmospheric engines, operating as shown, in combination with the air exhaust or discharge engine A, the piston of which is run at a speed to reduce the pressure in said column sufficiently to relieve the piston of said combined engines of atmospheric pressure on opposite sides alternately, substantially as herein described.

In witness whereof I have hereunto set my hand.

WILLIAM PARIS BARCLAY.

Witnesses:
   IRVING W. SCOTT,
   CHAS. G. YALE.